INVENTOR.
CURTIS C. JOHNSON

United States Patent Office 3,511,227
Patented May 12, 1970

3,511,227
MEASUREMENT OF BLOOD FLOW USING COHERENT RADIATION AND DOPPLER EFFECT
Curtis C. Johnson, Salt Lake City, Utah, assignor to University of Utah
Filed Feb. 27, 1967, Ser. No. 618,738
Int. Cl. A61b 5/02
U.S. Cl. 128—2.05   2 Claims

ABSTRACT OF THE DISCLOSURE

In vivo measurement of blood flow characteristics jointly using Doppler-shift phenomenon and coherent radiation wave propagation, the method including directing coherent light radiation into the blood stream of a patient, scattering the coherent light radiation by impinging the light radiation upon particles in the blood and comparing the frequency of the scattered light radiation with the frequency of the originally directed radiation to determine the flow characteristics of the blood. The method also comprises focusing an incident beam of coherent light radiation upon a moving part of the body and monitoring the movement by comparing the frequency of the incident beam with the frequency of the beam scattered by the moving body part.

---

Figure 1:
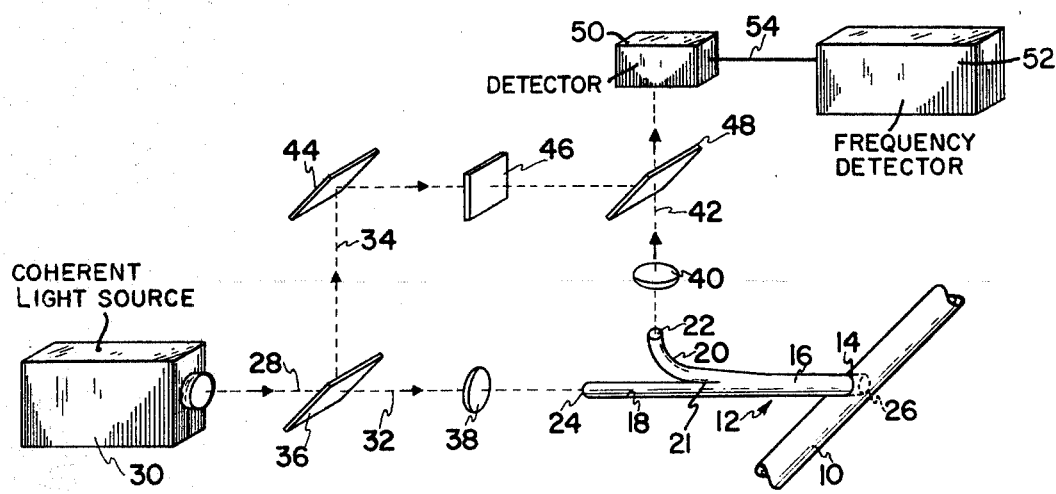

The present invention provides a system for in vivo measurement of blood flow or relative displacement of moving parts in a physiological system wherein, in the case of measuring blood flow, coherent electromagnetic wave radiation is admitted into the blood stream either through an optical catheter or needle or by selecting a specific wavelength which, without a venipuncture, will directly penetrate the blood stream, such that, after striking microscopic particles in the moving blood, scattered radiation when combined with a reference wave will yield a difference frequency which is proportional to the instantaneous velocity of a given moving particle.

Blood is a physiological fluid of primary concern in the medical care of human patients. Blood is composed of a number of components, but may be considered as comprising two broad groups, namely, serum and cells the proportions and rate of flow of which are medically important.

Presently, several types of flowmeters used to measure the flow rate of blood have been developed in an attempt to meet the acute demand of medical science, for example, the flowmeters described in U.S. Pats. Nos. 3,242,729; 3,078,841 and 3,075,515. Almost without exception blood flowmeters have possessed certain significant disadvantages. Imprecise flow measurements, supersensitive and expensive procedures, and the acquisition of only mean flow data for all blood particles cumulatively are typical problem areas which still persist in the art.

Accordingly, the present invention is regarded as a worthwhile contribution to the art because it, in a simplified manner, accommodates accurate measurement of the flow characteristics of the several fluid particles or cellular components of blood, preferably in vivo. In like manner, movement of parts of a physiological system, such as the lungs and heart, can also be ascertained.

In one presently preferred in vivo method of measuring blood flow, presented to illustrate but not to restrict the present invention, the distal end of a bifurcated radiation-transmitting catheter having two radiation conducting fiber bundle components having randomly interspersed radiation fibers is suitably inserted into the blood stream of a patient following a venipuncture. The catheter, when so placed, will be situated such that the bifurcated proximal ends of the catheter remain exterior of the patient. A columnar laser beam, emanating from a satisfactory source and comprising coherent waves of a predetermined frequency adapted to accommodate the measurement of the flow of any type of blood particles, is then split into two streams as by use of a conventional beam splitter. One stream is directed to a detector where it functions as a reference beam and the other stream of radiation is channelled into one of the bifurcated proximal ends of the catheter and along one fiber bundle component to function as a test beam. The test beam enters the flowing blood through the distal end of the catheter and strikes the microscopic blood particles resulting in scattering of the waves of coherent radiation having a Doppler-shifted frequency as contrasted with the frequency of the incoming test beam. The scattered radiation is picked up at the distal end of the catheter and is channelled by the second fiber bundle to the detector. The Doppler-shifted return beam is combined with the reference beam just prior to being received by the detector. The detected difference frequencies are proportional to the flow rates and concentrations of the flowing particles being examined.

Another presently preferred in vivo method of measuring blood flow according to the present invention comprises passing specific wavelengths of coherent radiation directly into and through the blood stream, without use of a catheter and absent a venipuncture. The ability of radiation of controlled wavelength to so pass through live tissue into, for example, the cardiovascular system, is hereinafter called the "physiological window" phenomenon. The incident radiation so passing into the blood stream is focusd at that point and subjected to a scattering effect by the blood. Radiation passing directly through the blood stream is re-focused, by a suitable lens system, on to the detecting surface of a phototube or the like detector to serve as a reference beam. Scattered radiation is collected and focused upon the detector by another lens system preferably situated in acute angular relation to the path of the reference beam. Again the detected difference frequencies are representative of the flow rate and concentration of blood particles under consideration.

Thus, it is a primary object of this invention to provide a simplified method of using coherent radiation to accurately measure fluid particle flow without using scattering contaminants.

Another important object of the present invention is to provide a system for analyzing in a physiological system complicated flow patterns of fluid containing different types of cellular components.

Another significant object of this invention is to provide a system for in vivo measurement of blood flow.

An additional object of no less importance is the provision of a method for measuring displacement of moving parts in a physiological system.

Figure 2:
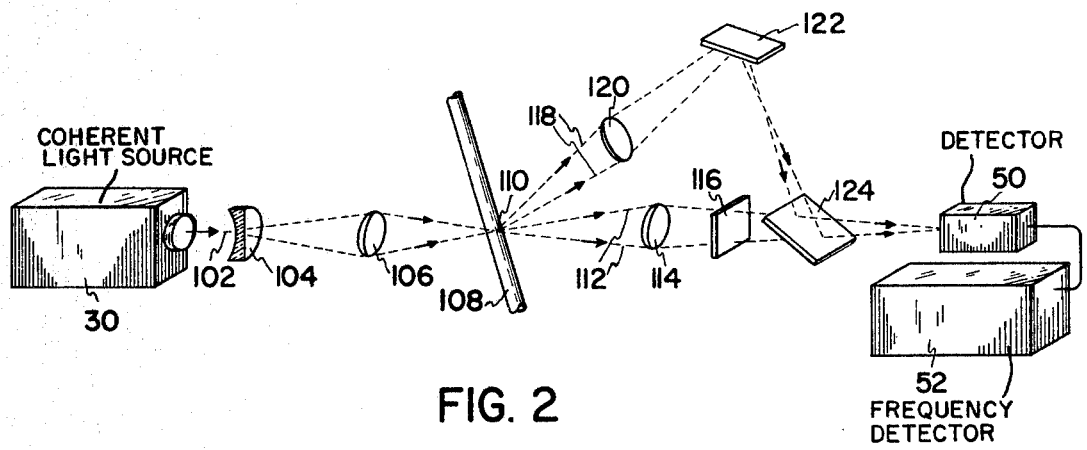

These and other objects and features of the present invention will become more fully apparent from the following description and appended claims taken in conjunction with the accompanying drawings wherein:

FIG. 1 is a diagrammatic representation of one presently preferred embodiment of the present invention; and FIG. 2 schematically depicts a second presently preferred embodiment, which makes use of the "physiological window" technique to measure fluid flow.

Reference is now specifically made to FIG. 1 wherein a flexible catheter 12 is shown extending through a venipuncture in the vein or artery wall 14 and the distal end 26 of the catheter disposed within a fluid-containing physiological lumen 10, for example, a blood vessel. Generally, penetration of the blood vessel 10 by the catheter 12 may be accomplished by any one of the variety of known methods; for example, the catheter 12 may be inserted through the hollow of a stylet needle after the needle has penetrated the blood vessel 10. The radiation-transmitting catheter 12 may be one of a number of commercially available devices primarily consisting of one small-diameter radiation conducting glass fiber bundle 16, with the fibers randomly subdivided into two bundle components 18 and 20 preferably encased in a sleeve (not shown). One example of a presently preferred catheter is manufactured by the American Optical Company, and is identified as Catalog No. 10902, Ser. No. 3691.

The catheter fiber bundle 16 is bifurcated at 21 and the two proximal end surfaces 22 and 24 of bundle components 20 and 18, respectively, as well as the distal end surface 26 are preferably highly polished and remain uncovered to facilitate uninhibited passage of radiation through the fiber bundle components 18 and 20. The fiber bundle components 18 and 20 of the catheter 12 are held together within a single sheath or sleeve (not shown) along the distal portion of the catheter.

Fiber bundle component 18 is fixed by suitable structure (not shown) in the direct path of a radiation beam 32 of coherent radiation generated by a laser source 30. Although any coherent electromagnetic wave source may be used, it is presently preferred that the source 30 be a laser that is preferably a columnar continuous wave source of coherent radiation where the wavelength can be closely set and maintained. Desirably, the laser 30 is adjusted such that a single mode of oscillation exists. The laser 30 should generally be short to prevent a multiplicity of longitudinal modes.

A coherent beam of radiation 28, generated by the laser 30 of suitable wavelength to provide optimum measurements of the flow of any given type of blood particles, is divided into two beams 32 and 34 by a conventional beam splitter 36, which can be a half-silvered mirror. For example, to optimize the measurement of the flow of red blood cells (erythrocytes) coherent radiation having a wavelength of about 633 millimicrons is satisfactory. One divided beam 32 is focused by a lens 38 into the end 24 of the branched catheter 12. This radiation passes along fiber bundle component 18 and is emitter from the distal end 26 of the catheter 12, which distal end is situated in the blood stream 10. The incoming radiation of beam 32 is scattered by the particles of the flowing blood.

A portion of this back-scattered, Doppler-shifted radiation having a different frequency than the frequency of the incident radiation, is picked up at the distal end 26 of the catheter 12, channelled through the fiber bundle component 20 and emitted from the second proximal end 22 as Doppler-shifted beam 42. Therefore, beam 42 is focused by lens 40 upon the detector surface of a standard photomultiplier tube 50, such as RCA 4102, or upon an optical mixing device such as the Philco L–4530 photomixer/photodetector diode. Prior to being impinged upon detector 50, the Doppler-shifted beam 42 passes through another beam splitter 48 where it is recombined with the reference coherent beam 34. Where desirable, the Doppler-shifted beam may be amplified prior to reaching the detector 50. The original frequency is maintained by the reference beam 34 as it is reflected off mirrored surface 44, through a filter 46 (which modifies the intensity of the reference beam 34 such that it optimizes the sensitivity of the detector) and, off the surface of beam splitter 48. Filtering of the Doppler-shifted beam may also be advantageous under some conditions.

Thus, the reference beam 34 and the Doppler-shifted beam 42 are coincident in the region between the beam splitter 48 and the detector 50. Accordingly, the detector 50 puts out an electrical signal representing the difference frequency between the two beams 34 and 42.

The output 54 of the detector 50 is electronically filtered such that a suitable frequency-detecting device 52 is affected essentially only by those frequencies directly relating to the flow of given types of blood particles being considered. Generally, in most physiological systems, these frequencies range on the order of about 100 kilocycles to several megacycles. The frequency-detecting device 52 is preferably a spectrum analyzer. However, other frequency-detecting devices, such as short wave receivers, could be used. Where the flowing fluid medium contains different components traveling at different rates, as does the blood, the composite output pattern comprising different frequency peaks generated by the different blood components, such as red cells, white cells, and platelets, can be displayed, and is representative of the relative concentrations and instantaneous velocities of these blood components. Thus, it is possible to utilize this technique for analyzing complicated flow patterns, such as may exist in a blood system containing different types of cellular components.

It is possible to eliminate external separation of the reference beam 34 from the test beam 32 by placing an aperture shield over the distal end 26 of the catheter (such as the one shown and described in my co-pending U.S. patent application Ser. No. 618,737, filed on even date herewith) and by passing all of coherent radiation from source 30 into the catheter end 24. This would do away with the need for mirrors 36, 44 and 48, and filter 46. In this way, radiation initially striking the shield will immediately return and enter the fibers of the bundle component 20 as a reference beam and will be combined with scattered, Doppler-shifted radiation also entering the fibers of bundle component 20. As described before, detector 50 would measure the difference frequencies.

Reference is now made to FIG. 2 which illustrates a second presently preferred embodiment of the present invention. The previously described laser or a similar radiation source 30 is used to generate a beam of coherent radiation 102 of selected wavelength which passes through diverging lens 104 and converging lens 106. The lens system 104 and 106 facilitate precise focusing of the laser beam directly on a selected part of a physiological system, such as at point 110 within a vein or artery 108. No catheter or venipuncture is required. The laser is adjusted such that the wavelength of the generated beam 102 will satisfactorily penetrate live tissue where the flow or displacement of moving parts is to be measured to advantageously use the "physiological window" phenomenon.

The incident coherent beam 102 is divided into two components, one component 118 which is scattered by selected particles of the flowing blood responsive to the wavelength being used, and one component 112 which passes essentially directly through the physiological system. The scattered beam 118 is characterized by a Doppler-shifted frequency differing from the original or incident frequency by an amount proportional to the flow of the blood. A substantial portion of the scattered radiation 118 is collected by a lens 120, situated at an acute angle relative to the path of beam 102, and is serially reflected by the surfaces of mirror 122 and beam splitter 124 so that the collected Doppler-shifted radiation 118 is focused on the detecting surface of the detector 50.

The remainder of the incident radiation 102 which passes through the blood stream 108 remains relatively unchanged in frequency and functions as a reference beam 112. Beam 112 is collected and converged by the lens 114 so that it passes through a filter 116, which alters the intensity of the reference beam 112 to optimize the sensitivity of the detector 50. The reference beam 112 emerges from the filter 116, passes through the beam splitter 124, and, coincident with beam 118, is focused on the detecting surface of the detector 50, which detector has been previously described. Where desirable, the Doppler-shifted beam may be amplified before it reaches the detector.

The electric signals transmitted from detector 50 to the device 52 represent the difference frequency, which is the combination of the frequency of the reference beam and the instantaneous frequency of the Doppler-shifted beam. In like manner, displacement of moving parts of a physiological system, such as the lungs or heart, can be ascertained.

It should now be appreciated that this invention makes possible an entirely new technique for measuring the flow of blood and the displacement of physiological parts. Localized flow rates may be measured in physiological systems either using a catheter or without surgically exposing the patient's blood stream. Moreover, by use of a radiation transmitting catheter, in vivo measurements of the existence, concentration and flow pattern of the separate cellular components of the blood, normal or abnormal, can be made. A knowledge of information in conjunction with flow passage size makes it possible to gain detailed information concerning cardiac output of a patient. It is also very significant that important information concerning the size of any type of flowing cells may be obtained from the flow patterns resulting from using this technique. Cell size may be readily measured by means of the cross section dependence of the size of a given cell and the intensity of a scattered radiation.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, to be embraced therein.

What is claimed and desired to be secured by United States Letters Patent is:

1. In a method of measuring, in vivo, the flow rate of blood particles moving through a lumen of a patient, the steps of: adjusting the wavelength of a coherent beam to accommodate penetration by the beam of live tissue and impingement of the coherent radiation upon the flowing blood particles, focusing said beam upon the lumen, dividing the beam which emerges from the lumen into a test beam and a reference beam, capturing the test beam comprising at least part of the coherent radiation scattered by impingement of the coherent radiation upon the blood particles, capturing the reference beam comprising unscattered coherent radiation, comparing the test beam with the reference beam and determining the flow rate of the blood particles as represented by said comparison.

2. In a method as defined in claim 1 wherein said dividing step comprises (a) impinging part of the laser beam upon the blood particles and (b) passing part of the laser beam essentially directly through the blood particles and wherein said capturing step takes place external of the patient.

References Cited

UNITED STATES PATENTS

| 2,790,438 | 4/1957 | Taplin et al. | 128—2 |
| 3,349,762 | 10/1967 | Kapany | 128—2.05 |

OTHER REFERENCES

Satomura: "Journal of the Acoustical Society of America," vol. 29, No. 11, November 1957, pp. 1181–1185.

Solomon: "Electronics," July 20, 1962, p. 26.

WILLIAM E. KAMM, Primary Examiner

U.S. Cl. X.R.

331—94.5